US007281139B2

(12) United States Patent
Stewart

(10) Patent No.: US 7,281,139 B2
(45) Date of Patent: Oct. 9, 2007

(54) AUTHENTICATING LEGACY SERVICE VIA WEB TECHNOLOGY

(75) Inventor: Graham W. Stewart, Scotlandwell (GB)

(73) Assignee: Sun Microsystems, Inc., Santa Clara, CA (US)

( * ) Notice: Subject to any disclaimer, the term of this patent is extended or adjusted under 35 U.S.C. 154(b) by 820 days.

(21) Appl. No.: 10/193,428

(22) Filed: Jul. 11, 2002

(65) Prior Publication Data

US 2004/0010714 A1 Jan. 15, 2004

(51) Int. Cl.
*G06F 15/16* (2006.01)
*G06F 15/177* (2006.01)
*G06F 7/04* (2006.01)
*G06F 17/30* (2006.01)
*G06K 9/00* (2006.01)

(52) U.S. Cl. ...................... 713/201; 709/209; 709/220; 726/2; 726/3; 726/11; 726/12; 726/29

(58) Field of Classification Search ................ 709/209, 709/220; 726/2–3, 11–12, 29
See application file for complete search history.

(56) References Cited

U.S. PATENT DOCUMENTS 6,298,378 B1 10/2001 Angal et al.
6,338,138 B1 1/2002 Raduchel et al.
2003/0188001 A1* 10/2003 Eisenberg et al. .......... 709/229
2004/0003293 A1* 1/2004 Viets et al. ................. 713/201
2004/0103322 A1* 5/2004 Wesinger et al. ........... 713/201
2004/0210774 A1* 10/2004 Chitturi et al. ............. 713/201

* cited by examiner

*Primary Examiner*—Nasser Moazzami
*Assistant Examiner*—Chinwendu C. Okoronkwo
(74) *Attorney, Agent, or Firm*—Kent A. Lembke; William J. Kubida; Hogan & Hartson LLP

(57) ABSTRACT

A system and method for authenticating a legacy service using internet technology is disclosed. An authentication module is associated with the legacy server. Service requests from a user of the legacy server are passed to the authentication module. The authentication module generates a service request for a web server, requesting access to a protected page from the web server, and transmits the user's credentials to the web server. The web server attempts to access the protected server, which causes the web server to access a network-based authentication service to determine whether the user's credentials qualify for access to the protected page. The web server transmits a message back to the authentication module, which determines whether the user's credentials qualify for access the legacy server based on the message from the web server.

14 Claims, 6 Drawing Sheets

AUTHENTICATING LEGACY SERVICE VIA WEB TECHNOLOGY

BACKGROUND OF INVENTION

1. Field of the Invention

The present invention relates to data processing systems, and particularly to network-based authentication of computer users.

2. Background

In the data processing arts, the term "authentication" refers generally to a process in which a user of a data processing system provides information to the system that permits the computer system to identify the user. Many data processing systems implement authentication systems that assign users a username and an associated password. The data processing system may store the username and password in a data file, e.g., a database. When the user accesses the data processing system, the user enters his or her username and password. The data processing system receives the username and password from the user and cross-references it against information in the data file. If there is a match, then the data processing system may permit the user to access the system. By contrast, if there is not a match, then the user may denied access to the system.

Most computer users are familiar with conventional authentication processes implemented by stand-alone computers. A "stand-alone computer" refers to a computer that is fully functional without having to connect to another device. Since the computer is fully functional, it has a processor, input/output capabilities, and an operating system with a file system. Conventional stand-alone computers may authenticate a user when the user attempts to log into the computer and then, based upon the outcome of the authentication, by either allowing or inhibiting the user form using the services of the computer. The term "services" refers to functionality provided by the computer system, such as access to the file system, e-mail system, or calendaring system.

The data processing environment in large organizations typically incorporates multiple computer networks that provide access to various computer-based services. In such an organization, the computers may be interconnected via a network, such as a local-area network, wide-area network, or the internet. Therefore, it may be advantageous to implement a network-based authentication service.

One technical problem encountered when implementing network-based authentication services is that legacy systems may not be compatible with network-based authentication services. Thus, there is a need in the art for systems and methods that permit legacy systems that are not compatible with a local user database or with network-based authentication services to authenticate users.

SUMMARY OF THE INVENTION

The present invention addresses these and other issues by providing systems, methods, and computer program products that use a web server to authenticate a user of a legacy server that lacks direct access to a network-based authentication service. An authentication module associated with the legacy server mimics the action of a web browser requesting a page from the web server. The legacy server obtains the user's credentials, which are provided to the web server in an attempt to request a protected page. The web server validates the user's credentials by requesting a protected page using the user's credentials. If the web server can access the protected page (indicating that the credentials were accepted), then the legacy server allows its user to log in. By contrast, if the web server is denied access to the protected page (indicating that the credentials were invalid), then the legacy server denies the login request.

DETAILED DESCRIPTION

The foregoing and other features, utilities and advantages of the invention will be apparent from the following more particular description of a preferred embodiment of the invention as illustrated in the accompanying drawings.

Figure 1:
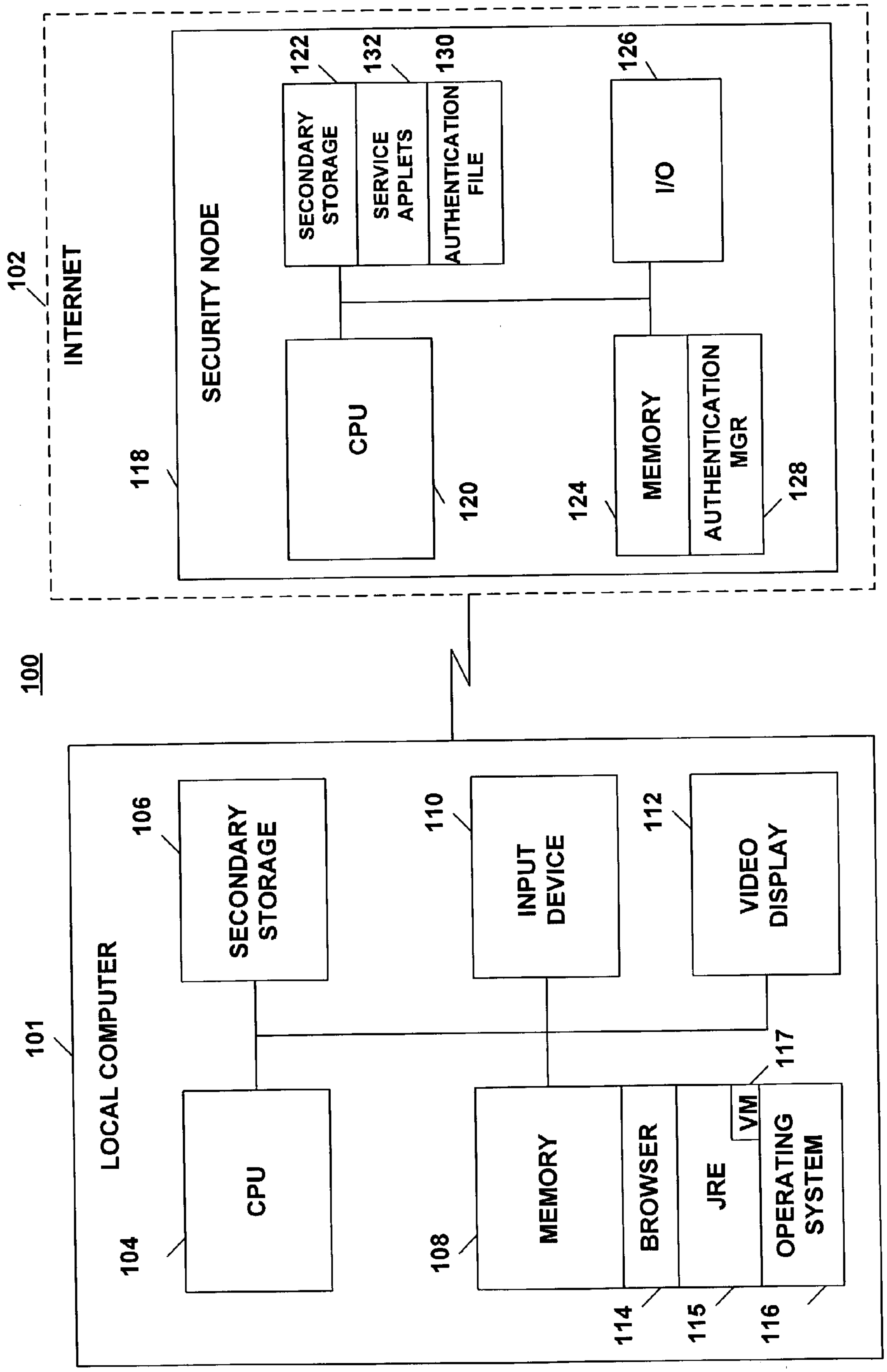
FIG. 1 is a schematic illustration of a data processing system suitable for use in the present invention.

FIG. 1 is a schematic illustration of a data processing system 100 suitable for use with methods and systems consistent with the present invention. Data processing system 100 may comprise local computer 101 connected to the Internet 102. Local computer 101 may be a stand-alone computer and hence is fully functional, containing central processing unit (CPU) 104, secondary storage device 106, memory 108, input device 110, and video display 112. Memory 108 may contain browser 114, Java.™. Runtime Environment 115, and operating system 116. Browser 114 may be used to provide access to web pages on the Internet 102 and may run on the Java Runtime Environment 115. An example of a suitable browser is the HotJava Browser available from Sun Microsystems of Palo Alto, Calif. The Java Runtime Environment 115 includes Java.™ Virtual Machine 117, which acts like an abstract computing machine, receiving instructions in the form of bytecodes and interpreting the bytecodes by dynamically converting them into a format suitable for execution on the processor and executing them. The Java Virtual Machine is described in greater detail in Lindholm and Yellin, The Java Virtual Machine Specification, Addison-Wesley (1997), which is incorporated herein by reference.

Internet 102 may contain security node 118 with CPU 120, secondary storage device 122, memory 124, and at least one I/O device 126. Secondary storage device 122 may contain an authentication file 130 that stores the data against which users may be authenticated, and service applets 132, facilitating use of various computer services when downloaded to browser 114. Authentication file 130 may contain the user name and password for authenticated users. Alternatively, one skilled in the art will appreciate that the authentication file 130 may contain information for performing authentication with digital token cards, such as enigma cards or information for performing authentication using digital certificates (such as x.509).

Service applets 132 facilitate use of a particular service when downloaded and run in browser 114 of local computer 101. For example, one service applet may be a file system applet providing a command-line user interface or graphical user interface that allows a user to manipulate the file system. Such an applet may be constructed using well-known user interface techniques to interact with the user and may use the Java.™. class libraries to manipulate the file system. In this case, the applet is "signed" or authenticated such that it can provide access to the file system. The Java class libraries are described in greater detail in Chan and Lee, The Java Class Libraries: An Annotated Reference, Addison-Wesley (1997), which is incorporated herein by reference. Other examples of service applets include an e-mail applet and a calendar applet that perform either well-known e-mail functionality or time-management functionality, respectively.

Although data processing system 100 depicts one computer being authenticated by the authentication manager, one skilled in the art will appreciate that the authentication manager may be used to perform authentication for many computers. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Furthermore, although local computer 101 is depicted as being connected to the Internet, one skilled in the art will appreciate that, instead of the Internet, the local computer may be connected to other networks like an Intranet or other local-area or wide-area networks. Sun, Sun Microsystems, the Sun Logo, Java and Java-based trademarks are trademarks or registered trademarks of Sun Microsystems Inc. in the United States and other countries.

Figure 2:
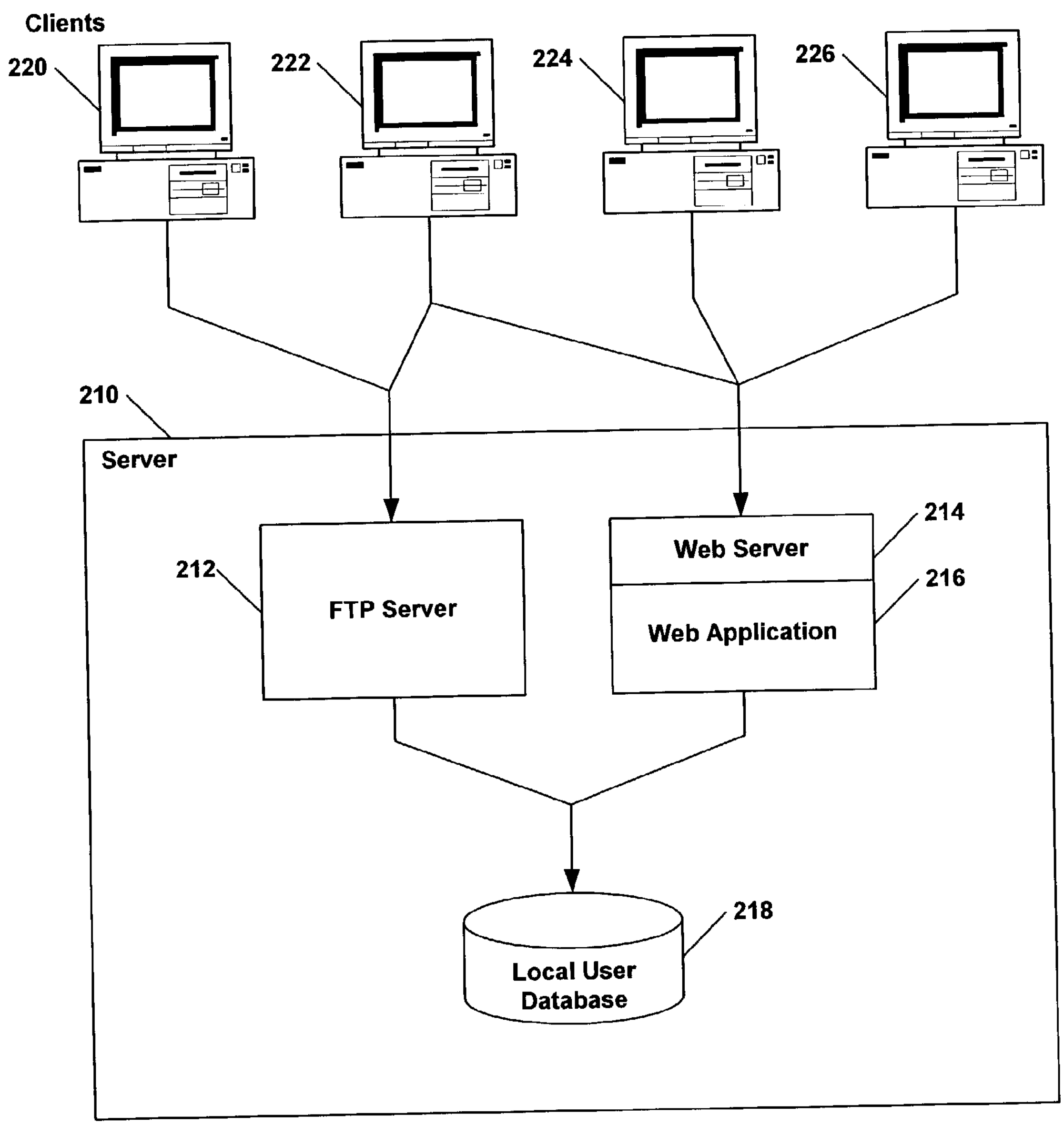
FIG. 2 is a schematic illustration of a typical network architecture for internet and network environments.

FIG. 2 is a schematic illustration of a typical network architecture for internet and network environments. Referring to FIG. 2, a server computer 210 provides multiple services to client systems. By way of example, server 210 may function as both a File Transfer Protocol (henceforth FTP) server 212 and Hypertext Transfer Protocol (henceforth HTTP or Web) server 214 to its clients. Web server 214 manages access to various web applications 216. Server 210 may be located either on the Internet, a private Intranet or on a Virtual Private Network (VPN), and may provide additional services to its clients.

Some clients may use multiple services provided by server 210, whereas other clients may connect only to a single service. By way of illustration, client 220 may connect only to the FTP server 212, while client 222 may connect to both the FTP server 212 and the web server 214. Clients 224 and 226 connect only to the web server 214.

To provide a consistent experience for clients it is common to use the same user database 218 for multiple services. This permits a user to access the multiple services offered by server 210 (e.g., the FTP server 212 and the web server 214) using the same username and password. User database 218 may be structured as a flat file or a local database.

The architecture illustrated in FIG. 2 presents a particular challenge with regard to scalability of the system. The architecture requires the user database to be available on the local file system. Therefore, it is difficult to split the task of serving users across a cluster of servers. A possible solution to this problem is to share disks between server clusters. However, sharing disks between servers can be expensive, and presents additional technical difficulties.

Figure 3:
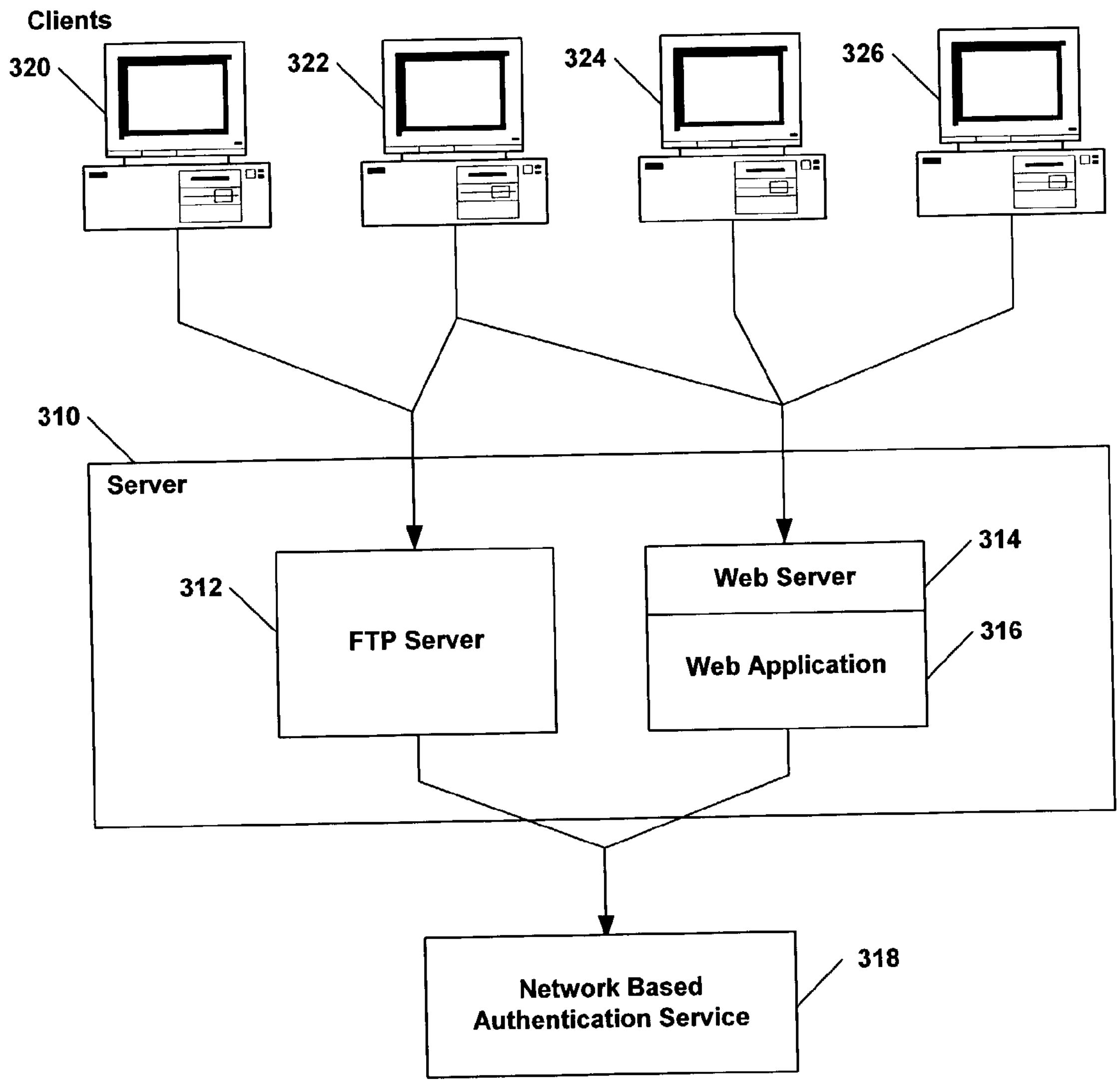
FIG. 3 is a schematic illustration of another network architecture for internet and network environments.

FIG. 3 is a schematic illustration of a network architecture in which both the FTP server 312 and the web server 314 use a network-based authentication service 318, rather than a local database, to authenticate clients 320, 322, 324, and 326. The network-based authentication service 318 may use an Industry Standard directory such as NIS, NIS+, or LDAP, or may take the form of a custom developed authentication service.

In some instances it is not possible for both the FTP Server and the application running on the Web Server to connect directly to the local user database or the network-based authentication service. For example, if the FTP server is a legacy system that pre-dates the network-based authentication service, then the FTP server's API may not be compatible with the network-based authentication service.

Figure 4:
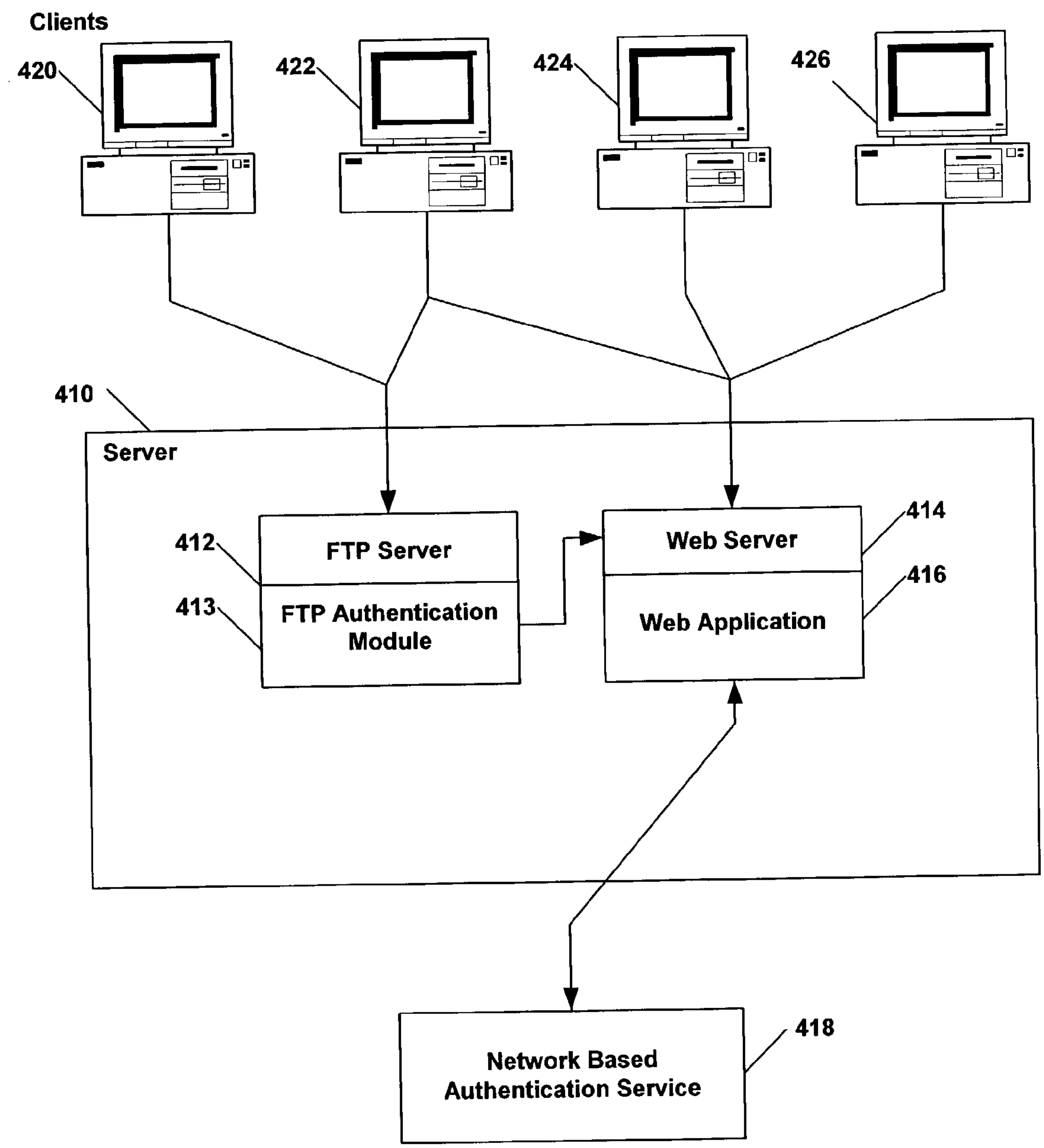
FIG. 4 is a schematic illustration of an exemplary network architecture in accordance with the present invention.

In one aspect, the present invention provides a network architecture and accompanying method for enabling an FTP server (or any other legacy system) to validate client credentials against a web server. FIG. 4 is a schematic illustration of an exemplary network architecture in accordance with the present invention. In the architecture depicted in FIG. 4, the FTP server uses the web server as a proxy server for authentication purposes. Clients 420, 422, 424, 426 connect to server 410 to access FTP server 412 and web server 414. An FTP authentication module 413 is associated with FTP server 412. When a user at a client (e.g., 420, 422) makes a service request from FTP server, the FTP server invokes authentication module 413 to request a protected page from web server 414. The authentication module 413 supplies the user's credentials (e.g., username and password) to the web server 414 with the request. The web server 414 then contacts the network-based authentication service 418, which checks the user's credentials. If the user's credentials are accurate, then the network-based authentication system generates a confirmation message. By contrast, if the user's credentials are not accurate, then the network-based authentication system 418 generates an error message. The message generated by the network-based authentication system 418 is transmitted back to the web server 414, which forwards the message back to the FTP authentication module 413, which, in turn, forwards the message to the FTP server 412.

If the message is a confirmation message, then the FTP server may grant the user access to its services. By contrast, if the message is a rejection, then the FTP server may deny the user access to its services.

In an exemplary embodiment, the FTP authentication module 413 may emulate a web browser in its communication with web server 414. The FTP authentication module 413 may send a request to web server 414, specifying a URL (possibly by means of a proxy server). In an exemplary embodiment, the URL may be stored in a .config file on server 410. Web server 414 may maintain a list of protected resources (e.g., URLs), which may be stored in a directory. Web server 414 may accept the request and compare it to an access control list, determining that the requested page is protected. Web server 414 may then send a response to the FTP authentication module 413 requesting the user's credentials. The FTP authentication module may then provide the web server 414 with the user's credentials (which may have been previously collected by the FTP server, or may be collected in real time, e.g., by displaying a login box or form, asking the user to provide credentials). Web Server 414 may then authenticate the credentials against the network-based authentication service 418, which may determine whether the user's credentials are valid and return the user's status to web server 414. The status may be passed back to FTP authentication module, which determines whether to grant the user access to the FTP server based on the response from web server 414. If the response is positive, then access may be granted. By contrast, if the response is negative, then access may be denied.

Figure 5:
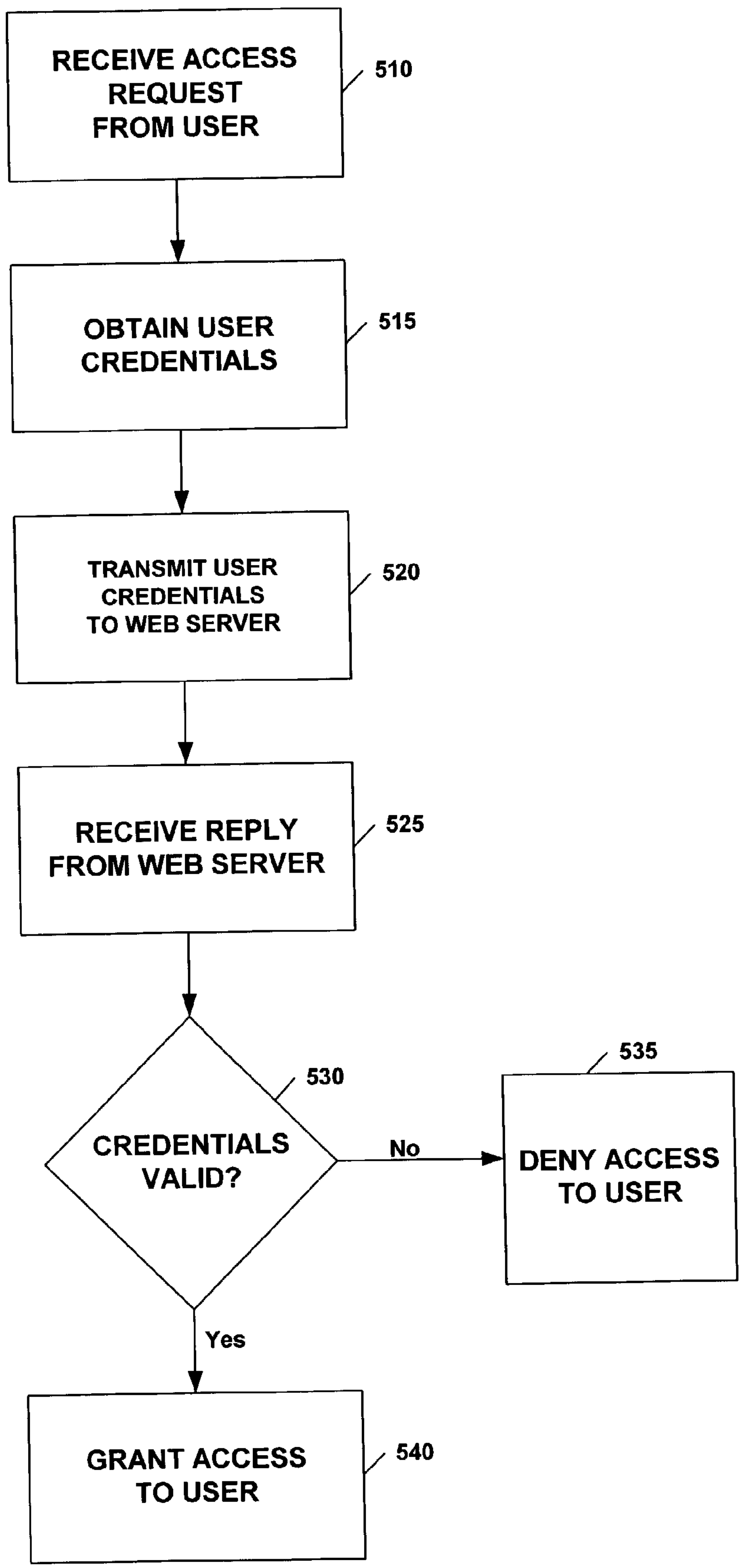
FIG. 5 is a schematic illustration of an exemplary network architecture in accordance with the present invention.

FIG. 5 is a flowchart illustrating operations of an exemplary embodiment of an FTP Authentication Module 413. In an exemplary embodiment, FTP Authentication Module 413 may be implemented as a software process that emulates the communications of a web browser. At step 510, FTP Authentication Module 413 receives an access request from a user. At step 515 FTP Authentication Module 413 obtains the user's credentials (e.g., username and password) from the user request. At step 520, the user's credentials are transmitted to the web server 414. As described above, the user's credentials may be transmitted to the web server 414 as part of a service request for access to a protected resource, i.e., a protected URL. The web server 414 processes the service request, and responds with either an access granted or an access denied message, which is received at step 525. At step 530, FTP Authentication Module 413 determines whether the user's credentials were valid. In an exemplary embodiment, if the web server 414 responds with an access denied message, then the user's credentials are deemed not to be valid and the FTP Authentication Module 413 generates a message indicating that access to the FTP server is denied (step 535). By contrast, if the web server 414 responds with an access granted message, then the user's credentials are deemed to be valid, and the FTP Authentication Module 413 generates a message that indicates that access to the FTP server is granted (step 540). This message may be transmitted to the FTP server 412, which may grant (or deny) the user access based on the message.

Figure 6:
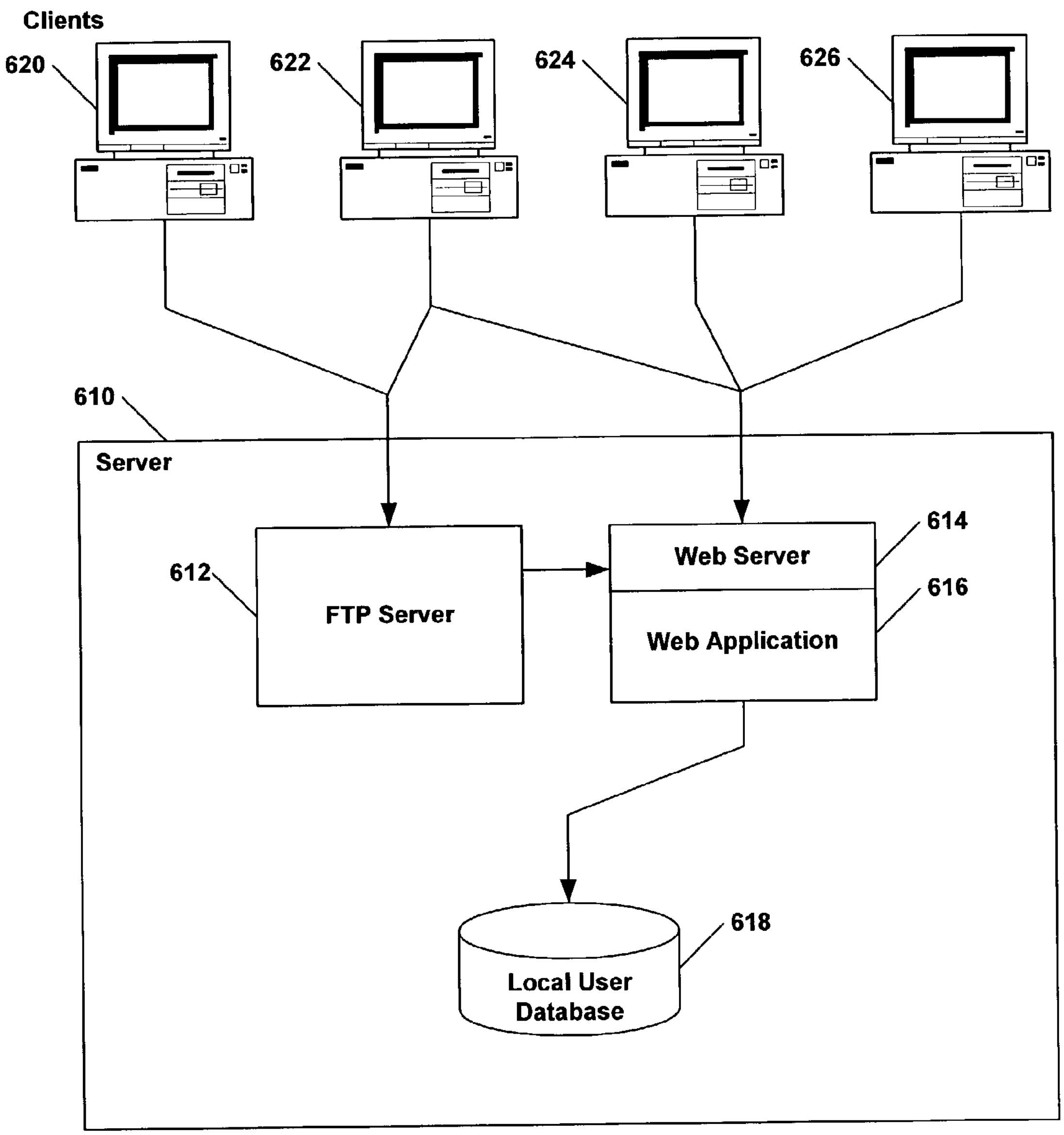
FIG. 6 is a schematic illustration of an exemplary network architecture in accordance with the present invention.

FIG. 6 is a schematic illustration of another exemplary network architecture in accordance with the present invention. In the architecture depicted in FIG. 6, the FTP server uses the web server as a proxy server for authentication purposes, but users are authenticated against a local database rather than a network-based authentication service. Clients 620, 622, 624, 626 connect to server 610 to access FTP server 612 and web server 614. An FTP authentication module 613 is associated with FTP server 612. When a user at a client (e.g., 620, 622) makes a service request from FTP server, the FTP server invokes authentication module 613 to request a protected page from Web server 614. The authentication module 613 supplies the user's credentials (e.g., username and password) to the web server 614 with the request. The web server 614 then contacts the local user database 618, which checks the user's credentials. If the user's credentials are accurate, then the network-based authentication system generates a confirmation message. By contrast, if the user's credentials are not accurate, then the local user database 618 generates a denial message. The message generated by the local user database 618 is transmitted back to the Web server 614, which forwards the message back to the FTP authentication module 613, which, in turn, forwards the message to the FTP server 612.

The architecture of the present invention has numerous advantageous features. First, writing a FTP Server module which Cross-Authenticates against a Web Server is (in many cases) easier than trying to develop an application that interfaces directly with a network-based authentication service. Since the HTTP protocol is completely open and fairly simple to implement.

Second, in the system and method of the present invention, the FTP server may be independent of the implementation of the network-based authentication service. In fact, the FTP authentication module may operate against a local user database (if that is what the web server is configured to do). This eases the migration to a network-based authentication service since the FTP authentication module can be pointed to the FTP Server at the Web Server, after which the Web Server configuration can be changed at will in the knowledge that the FTP Server will continue to function Third, if the network-based authentication service fails, then the web server configuration can be changed to point to a backup service, and without any further intervention the FTP server will also indirectly use this service.

Fourth, if the network-based authentication service is upgraded, then only the Web Server must be changed, which reduces development efforts.

While the invention has been particularly shown and described with reference to a preferred embodiment thereof, it will be understood by those skilled in the art that various other changes in the form and details may be made without departing from the spirit and scope of the invention.

What is claimed is:

1. A method for authenticating users of a first server using a network-based authentication service, comprising the steps of:

receiving, at the first server, a first service request including client authentication information, wherein the first server lacks direct communication access to the authentication service and wherein the first server provides a first service;

in response to receiving the service request, generating a second service request for a second server, which provides a protected second service different from the first service, that has communication access to the network-based authentication service, wherein the second service request seeks access to the protected second service provided by the second server, and wherein the second service request includes the client authentication information from the first service request;

at the first server, receiving a reply to the second service request; and determining with the first server whether to grant access to the first service based on whether the authentication information permitted access to the protected second service provided by the second server.

2. The method of claim 1, wherein the first service request is received from a client computer.

3. The method of claim, wherein the first server emulates a web browser to the client computer.

4. The method of claim 3, wherein the second service request is a request for a URL and wherein the first service comprises a file transfer service and the second protected service comprises a Web service.

5. The method of claim 4, wherein the URL is stored in a configuration file associated with the second server.

6. A network architecture for authenticating users of a computer system, comprising:

a first server wherein the first server lacks direct communication access to the authentication service and wherein the first server provides a first service;

a second server communicatively connected to an authentication service;

an authentication module operatively associated with the first server for interfacing with the second server and adapted to receive a receive a service request from a user of the first server, wherein the service request includes authentication information, and to generate a second service request for the second server, wherein the second service request seeks access to a protected service provided by the second server, and wherein the second service request includes the authentication information from the first service request.

7. The network architecture according to claim 6, wherein the first server is a FTP server.

8. The network architecture according to claim 6, wherein the second server is a web server.

9. The network architecture according to claim 6, wherein the authentication module is implemented as a software process.

10. The network architecture according to claim 6, wherein the authentication module is further adapted to receive a reply to the service request from the second server.

11. The network architecture according to claim 10, wherein the authentication module is further adapted to determine whether to grant access to the first service based on whether the authentication information permitted access to the protected service provided by the second server.

12. A method for authenticating users of a first server using an authentication service, comprising the steps of:

receiving, at the first server, a first service request including client authentication information, wherein the first server lacks direct communication access to the authentication service and wherein the first server provides a service;

in response to receiving the service request, generating a second service request for a second server providing a protected Web service that has access to the authentication service, wherein the second service request seeks access to the protected second service provided by the second server including obtaining authentication from the authentication service using the client authentication information from the first service request that was included in the second service request;

at the first server, receiving a reply to the second service request; and determining with the first server whether to grant access to the first service based on whether the authentication information permitted access to the protected second service provided by the second server.

13. The method of claim 12, wherein the generating of the second service request comprises retrieving a URL from a list of protected URLs associated with the second server and including the retrieved URL with the client authentication information in the second service request.

14. The method of claim 12, wherein the service provide by the first server is a FTP-based service.

* * * * *

UNITED STATES PATENT AND TRADEMARK OFFICE

CERTIFICATE OF CORRECTION

PATENT NO. : 7,281,139 B2
APPLICATION NO. : 10/193428
DATED : October 9, 2007
INVENTOR(S) : Graham W. Stewart It is certified that error appears in the above-identified patent and that said Letters Patent is hereby corrected as shown below:

Column 6, line 44 claim 2, insert --1-- after "claim"

Column 6, line 54, insert --,-- after first occurrence of "server"

Column 6, line 61, after first occurrence of "receive" delete "a receive"

Signed and Sealed this

Eighteenth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,281,139 B2
APPLICATION NO. : 10/193428
DATED : October 9, 2007
INVENTOR(S) : Graham W. Stewart It is certified that error appears in the above-identified patent and that said Letters Patent is hereby corrected as shown below:

Column 6, line 44 claim "2", should be claim --3--

Signed and Sealed this

Tenth Day of November, 2009

David J. Kappos

David J. Kappos
*Director of the United States Patent and Trademark Office*